No. 740,491. PATENTED OCT. 6, 1903.
T. S. TILLEY.
COMBINED LEVEL AND INCLINOMETER.
APPLICATION FILED DEC. 13, 1902.
NO MODEL. 2 SHEETS—SHEET 1.
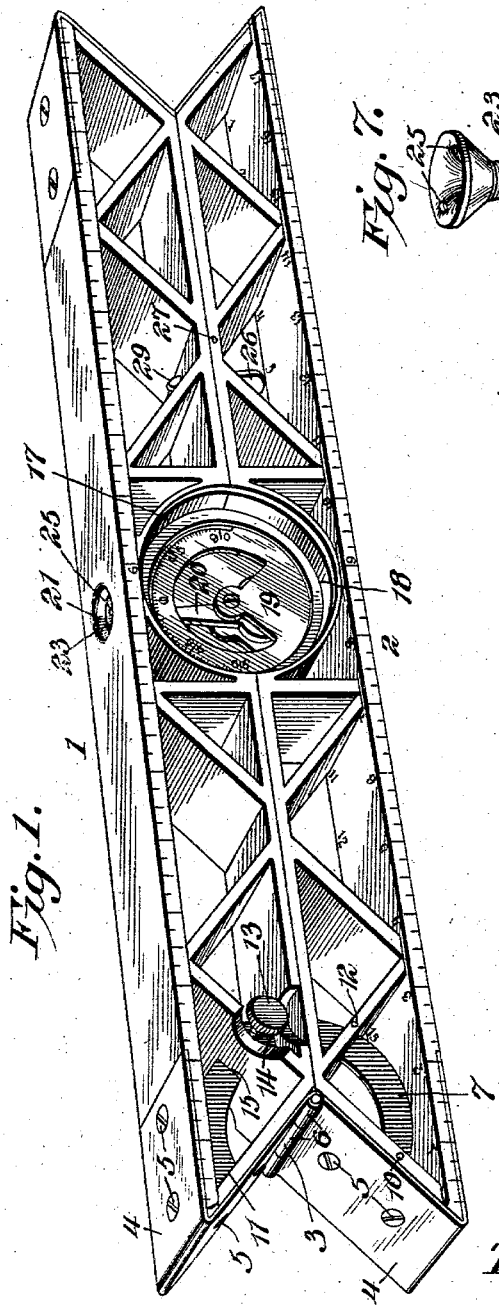
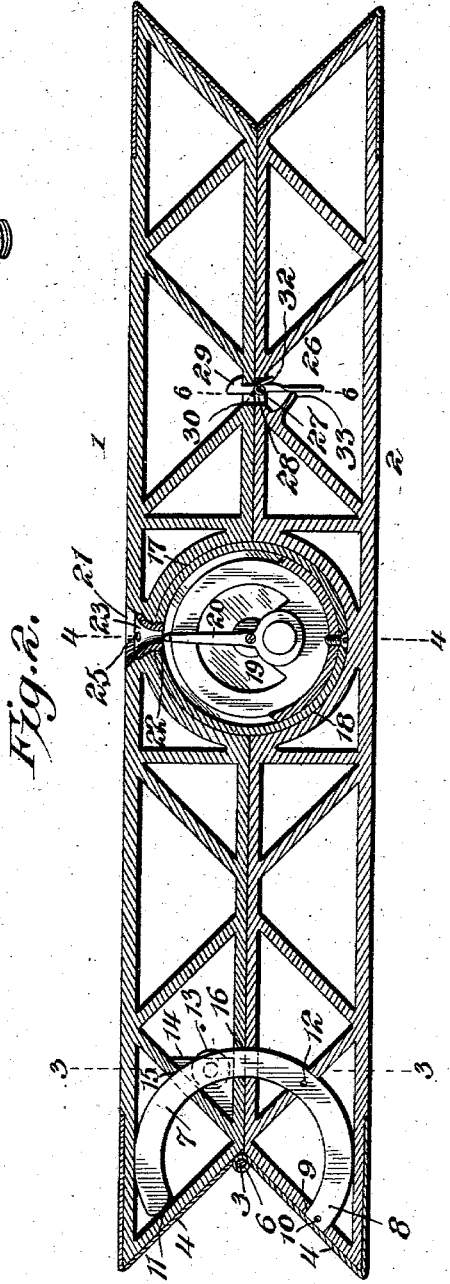
Thomas S. Tilley, Inventor,
Witnesses
Howard W. Orr.
By E. G. Siggers
Attorney No. 740,491. PATENTED OCT. 6, 1903.
T. S. TILLEY.
COMBINED LEVEL AND INCLINOMETER.
APPLICATION FILED DEC. 13, 1902.
NO MODEL. 2 SHEETS—SHEET 2.
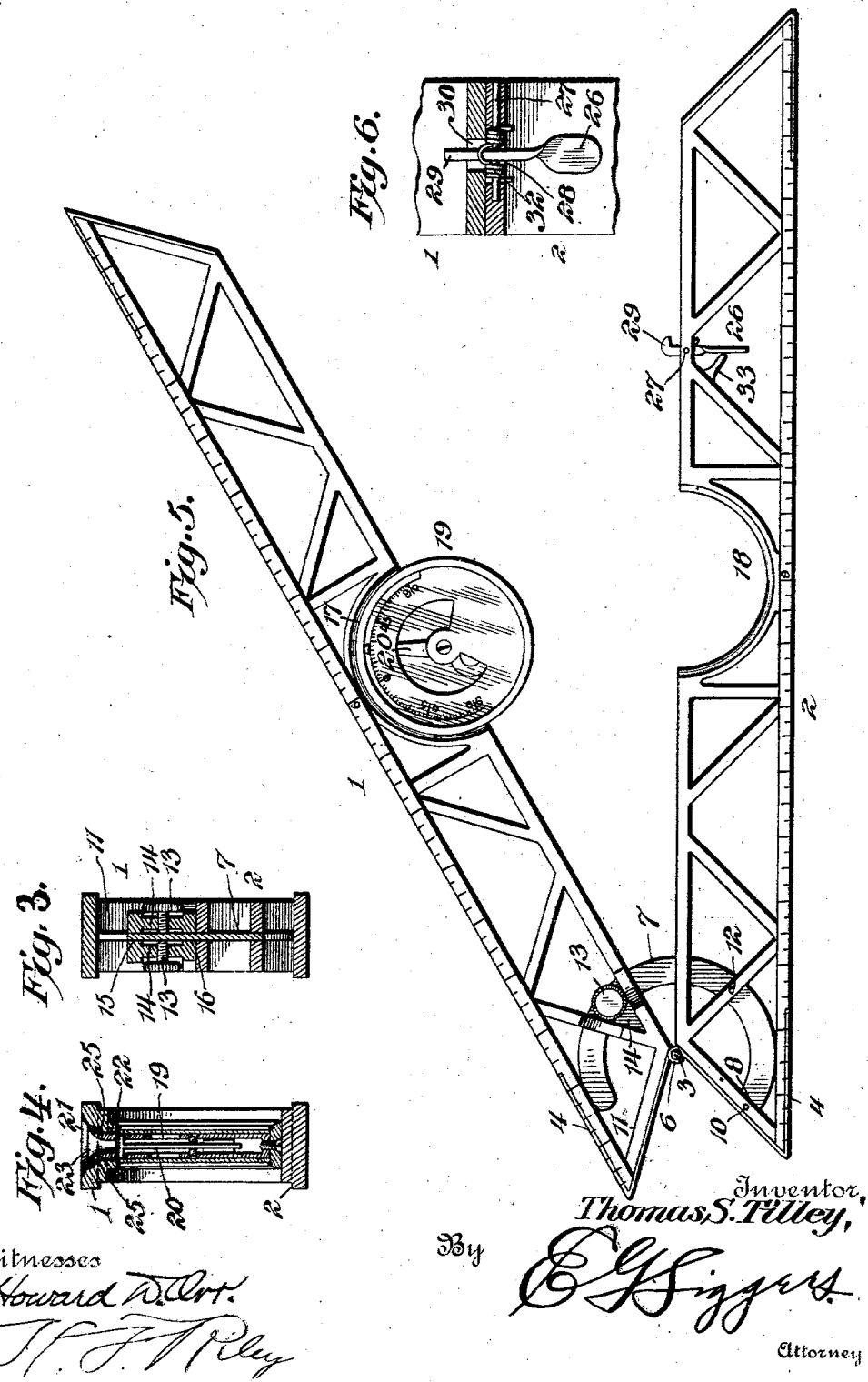
Witnesses
Howard W. Ort.
J. F. T. Riley
Inventor,
Thomas S. Tilley,
By E. G. Siggers
Attorney No. 740,491. Patented October 6, 1903.

UNITED STATES PATENT OFFICE.

THOMAS SEYMOUR TILLEY, OF NEWPORT, RHODE ISLAND, ASSIGNOR OF ONE-HALF TO JAMES OSCAR PECKHAM, OF MIDDLETOWN, RHODE ISLAND.

COMBINED LEVEL AND INCLINOMETER.

SPECIFICATION forming part of Letters Patent No. 740,491, dated October 6, 1903.

Application filed December 13, 1902. Serial No. 135,090. (No model.)

*To all whom it may concern:*

Be it known that I, THOMAS SEYMOUR TILLEY, a citizen of the United States, residing at Newport, in the county of Newport and State of Rhode Island, have invented a new and useful Combined Level and Inclinometer, of which the following is a specification.

The invention relates to improvements in combined levels and inclinometers.

The object of the present invention is to improve the construction of combined levels and inclinometers and to provide a simple, inexpensive, and efficient one of great strength and durability designed to be constructed of any size, from a pocket instrument to a contractor's tool, and capable when closed and arranged for use as a level of presenting straight flat upper and lower horizontal faces or edges adapted to be placed contiguous to any work.

A further object of the invention is to provide a measuring instrument of this character in which the inclinometer will be located wholly within the contour of the sections of the level-bar at all times, whereby it will be prevented from projecting beyond the straight side faces of the sections of the level-bar and interfering with the arrangement of those faces against the work.

Another object of the invention is to arrange the adjusting devices for securing the bars or sections of the bottom of the level in their adjustment wholly within the contour of the level body or bar when the device is closed and to prevent such adjusting devices from projecting beyond the same when the instrument is opened.

The invention also has for its object to provide an inclinometer of this character housed within the level bar or body and adapted to permit its pointer or indicator to be seen from the top of the level body or bar, as well as at the side faces of the same.

With these and other objects in view the invention consists in the novel construction and arrangement of parts hereinafter fully described, illustrated in the accompanying drawings, and particularly pointed out in the claims hereto appended, it being understood that changes in the form, proportion, and minor details of construction within the scope of the claims may be made without departing from the spirit or sacrificing any of the advantages of the invention.

In the drawings, Figure 1 is a perspective view of a combined level and inclinometer constructed in accordance with this invention and shown closed. Fig. 2 is a longitudinal sectional view of the same. Fig. 3 is a transverse sectional view on the line 3 3 of Fig. 2. Fig. 4 is a similar view on the line 4 4 of Fig. 2. Fig. 5 is a side elevation of the combined level and inclinometer, the same being opened to arrange the upper bar or section at an inclination. Fig. 6 is a detail sectional view on the line 6 6 of Fig. 2, illustrating the construction of the catch for locking the bars or sections in their closed position. Fig. 7 is a detail view of the tubular screw for securing the inclinometer to the upper section or bar to provide a sight-aperture for permitting the pointer or indicator to be seen from the top of the instrument when the same is arranged to form a level, as shown in Figs. 1 and 2.

Like numerals of reference designate corresponding parts in all the figures of the drawings.

1 and 2 designate upper and lower sections or members of a level body or bar, and the said sections or members 1 and 2, which may be constructed of any desired material, preferably consist of skeleton frames, as shown in the accompanying drawings, and they are connected together at one end by a hinge 3. The ends of the sections or members are mitered or beveled at an angle of forty-five degrees at their inner faces, and the upper section or member is adapted to be swung upward away from the lower section or member to arrange it at an inclination, as illustrated in Fig. 5 of the drawings. The side edges of the bars or sections 1 and 2 are graduated and marked off in inches and fractions thereof adjacent to the upper and lower faces of the level-body, which are straight and flat and which are adapted to be placed against the work. The hinge 3 is composed of two approximately V-shaped leaves 4, conforming to the configuration of the tapered ends of the bars or sections 1 and 2 and secured to the same by screws 5 or other suitable fastening devices and having eyes 6 at the inner adjacent longitudinal faces of the said bars or sections. The leaves incase the tapered ends of the bars or sections and are seated in suitable recesses thereof, so that their outer faces are flush with the adjacent faces of the bars or members; but the hinge may be constructed in any other desired manner, as will be readily understood.

The bars or sections are secured at the desired adjustment when they are arranged at an angle to each other by means of a curved or arcuate bar or brace 7, located adjacent to the hinged ends of the same and secured at its end 8 to the lower bar or section 2 in a slot or recess 9 thereof by a pin 10 or other suitable fastening device. The slot or recess 9 is arranged in the inclined portion forming the mitered or beveled end of the lower bar or section, and the curved or arcuate brace or connecting-bar extends through slots or openings of the adjacent portions of both bars or sections 1 and 2 and terminates at the inclined portion 11 of the upper bar or section at the mitered or beveled end thereof. The lower bar or section 2 is also secured to the curved bar or brace 8 by means of a fastening device 12, mounted on one of the inclined connecting portions of the skeleton constituting the said lower bar or section 2; but the connecting-bar or brace may be secured to the lower section or member in any other desired manner. The upper portion of the curved or arcuate bar 8 is engaged by a pair of clamping-screws 13, mounted in threaded openings of webs or flanges 14, forming opposite ears or lugs and arranged adjacent to the inner or lower face of the upper bar or section 1. The set or clamping screws 13 are provided at their outer ends with milled heads and are adapted to be readily rotated to engage and release the curved or arcuate bar or brace. The webs or flanges 14 are located at opposite sides of the slots or openings 15 and 16 of the upper bar or section through which the curved connecting-bar or brace passes, and the latter does not project beyond the upper and lower straight faces of the bars or sections 1 and 2 in any position of the same and does not interfere with the arrangement of such braces against the work. The beveled or mitered ends of the bars or sections at the hinge limit the movement of the sections or bars and permit the same to be opened to an angle of ninety degrees to form a square.

The bars or sections 1 and 2 are provided with central semicircular recesses 17 and 18, forming a central circular opening when the device is closed for the reception of an inclinometer 19, which is constructed substantially the same as that shown and described in Patent No. 711,801, granted to me October 21, 1902. The inclinometer, which is provided with a pivoted indicator or pointer 20, is located wholly within the area or contour of the level-body when the device is closed, and it does not at any time project beyond the outer straight faces of the bars or sections when the device is opened. The inclinometer, which is cylindrical, is carried by the upper bar or section, and when the device is closed it fits within the semicircular recess or socket of the lower bar or section. The upper bar or section is provided at the top with a central opening 21, having a reduced lower end communicating and registering with a threaded aperture 22 of the casing of the inclinometer to permit a tubular screw 23 to engage the same. The tubular screw 23 is provided with a head forming an enlarged flaring opening and adapted to permit the indicator to be seen from the top of the level-body to enable the device to be used as a common level when the same is closed. The exterior of the head of the screw is beveled at the bottom, and the opening of the top bar or section conforms to the configuration of the same. The screw is also provided at its head with opposite perforations 25, adapted to receive a key or other tool for enabling the screw to be readily rotated. The upper end of the pointer or indicator may be readily seen from the top of the level-body when the latter is in a horizontal position, and the opening 21 of the upper section or bar is flared above the screw, as shown in Fig. 4, to enable the pointer or indicator to be observed with greater facility.

The bars or sections of the level-body are locked in their closed position by a spring-actuated catch 26, pivoted by a transverse pin 27 or other suitable fastening device in a slot or opening 28 of the lower section or bar and provided with a projecting head 29, arranged to extend through a slot 30 of the upper section or member and engage the latter, as clearly shown in Fig. 2 of the drawings. The pin 27 passes through the catch between the ends thereof, and the lower end is enlarged and given a quarter bend to arrange it transversely of the level-body to form a finger-piece. The upper portion or arm of the catch is engaged by a spring 32, consisting of a central loop and a pair of opposite spring-coils, the latter being disposed on the pin or pivot 27 at opposite sides of the catch, as clearly shown in Fig. 6 of the drawings. The loop receives and engages the catch to hold the same in position for engaging the upper section or bar. The engaging portion or head of the catch is beveled at the top to enable it to be automatically forced backward when the device is closed, whereby the catch will automatically lock the same in such position. The rearward movement of the lower portion of the catch is limited by a finger or projection 33 of the lower bar or section to form a support for the catch when the same is in engagement with the upper bar or section. When the lower portion or finger-piece of the catch is pressed forward, the upper engaging portion is moved rearward against the action of the spring to release the upper bar or section to permit the instrument to be opened.

The upper bar or section is cut away at opposite sides adjacent to the heads of the clamping or set screws to enable the latter to be arranged within the space between the side edges of the level-body, so that the said screws will not interfere with the use of the instrument.

When it is desired to use the instrument as an ordinary level, the bars or sections are closed and locked in the position illustrated in Fig. 1 of the drawings. The indicator or pointer may then be observed from either the sides or the top of the level-body. When it is desired to obtain the angle of an inclination, the bars or sections are unlocked and the upper one is raised to open the device to the necessary extent.

It will be seen that the instrument is simple and comparatively inexpensive in construction and at the same time strong and durable, that it is adapted for use either as a level or an inclinometer, and that when used as a level the indicator or pointer may be observed from either the top or sides of the level-body. Also it will be clear that the sight-aperture of the top of the instrument is formed by the means for securing the inclinometer to the upper section or bar. Furthermore, it will be apparent that as the means for securing the bars or sections at the desired adjustment do not project beyond the faces and edges of the level-body they will not interfere with the use of such faces, which may be arranged close to the parts to be measured or leveled.

What I claim is—

1. An instrument of the class described, comprising a level-body composed of two sections or members of the same shape hinged together and provided with straight top and bottom faces and having straight side edges, a connecting-bar or brace arranged wholly within the contour of the level-body when the bars or sections are closed and connected with one of the sections or members, and means also located within the contour of the level-body for engaging the connecting-bar or brace for securing the sections or members at the desired adjustment, whereby straight top and bottom faces and side edges are adapted to be placed against the work, substantially as described.

2. An instrument of the class described, comprising a level-body composed of two sections or members of the same shape hinged together at one end, and provided with straight top and bottom faces and side edges, a curved connecting-bar or brace located wholly within the contour of the level-body and secured to one of the sections or members, and clamping-screws mounted on the other section or member and located within the contour of the level-body at opposite sides of the connecting-bar or brace to permit any one of the straight faces or edges to be placed against the work and arranged to engage the connecting-bar, substantially as described.

3. An instrument of the class described, comprising two sections or members of the same shape consisting of skeleton frames hinged together and provided adjacent to the hinged ends with slots or openings, said sections or members being provided with straight top and bottom faces and side edges, a curved or arcuate connecting-bar or brace arranged within the slots or openings and secured to one of the sections or members, said bar or brace being located wholly within the contour of the sections or members when the instrument is closed, and means located within the contour of the said sections or members for engaging the bar or brace, whereby any one of the straight edges or faces is adapted to be placed against the work, substantially as described.

4. An instrument of the class described, comprising two similar sections or members of the same shape forming a level-body, and consisting of skeleton frames hinged together and provided with slots or openings and having opposite webs or flanges provided with threaded perforations, an arcuate connecting-bar or brace arranged in the slots or openings and located wholly within the contour of the level-body when the instrument is closed and secured to one of the sections or members, and clamping-screws mounted in the threaded perforations and located within the contour of the sections or members and arranged to engage the bar or brace at opposite sides thereof, substantially as described.

5. An instrument of the class described, comprising a level-body having an opening, an inclinometer arranged in the opening, and means for securing the inclinometer to the level-body, said means forming a sight-opening, substantially as described.

6. An instrument of the class described, comprising a level-body having an opening, an inclinometer arranged within the opening, and a tubular fastening device securing the inclinometer to the level-body and forming a sight-opening, substantially as described.

7. An instrument of the class described, comprising a level-body having an opening, an inclinometer arranged within the opening, and a hollow fastening device securing the inclinometer to the level-body and located at the top of the latter and forming a sight-opening, substantially as described.

8. An instrument of the class described, comprising a level-body having an opening, an inclinometer arranged within the opening and provided at the top with threads, and a tubular screw extending through the top of the level-body and engaging the screw-threads of the inclinometer, and forming a sight-opening to permit the inclinometer to be observed from the top of the instrument, substantially as described.

9. An instrument of the class described, comprising a body having an opening, an inclinometer arranged within the opening of the body and provided with a threaded aperture, and a tubular screw extending through the top of the body and engaging the screw-threads of the inclinometer and provided with an enlarged head, forming a flaring mouth for the opening of the screw, substantially as described.

10. An instrument of the class described, comprising two sections or members provided with approximately semicircular recesses, one of the sections or members being also provided with an opening communicating with the recess, a cylindrical inclinometer having a threaded opening, and a tubular screw arranged in the opening of the section or member and engaging the screw-threads of the inclinometer and securing the latter to such section or member, said screw also forming a sight-opening, substantially as described.

11. An instrument of the class described, comprising two sections or members of the same shape hinged together at one end of the instrument and provided with straight top and bottom faces and side edges, an inclinometer carried by one of the sections or members and arranged between the ends thereof, and a catch located within the contour of the instrument and mounted on one of the sections or members at a point between the ends thereof and engaging the other, substantially as described.

12. An instrument of the class described, comprising two skeleton sections or members hinged together and forming a level-body and having straight top bottom faces and side edges, a spring-actuated catch mounted on one of the sections or members at a point between the ends thereof and located within the contour of the level-body and arranged to automatically engage the other section or member, said catch being provided with a finger-piece, and a projection arranged adjacent to the same, said finger-piece and projection being located in one of the openings of the skeleton frame, substantially as described.

13. An instrument of the class described, comprising two sections or members of the same shape hinged together and having mitered ends, an arcuate connecting-bar or brace arranged adjacent to the hinged ends of the sections or members and located wholly within the contour of the same when the instrument is closed, means for engaging the arcuate bar or brace for securing the sections or members at the desired adjustment, an inclinometer located between the ends of the sections or members and mounted on one of the same, and a catch mounted on one of the sections or members and arranged to engage the other automatically when the instrument is closed, substantially as described.

In testimony that I claim the foregoing as my own I have hereto affixed my signature in the presence of two witnesses.

THOMAS SEYMOUR TILLEY.

Witnesses:
BYRD WEAVER,
LOUIS M. JANES.